(12) United States Patent
Yamashita

(10) Patent No.: US 10,223,052 B2
(45) Date of Patent: Mar. 5, 2019

(54) USAGE RECORD COMPILING SYSTEM AND USAGE RECORD COMPILING METHOD

(71) Applicant: Akihiro Yamashita, Kanagawa (JP)

(72) Inventor: Akihiro Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/882,118

(22) Filed: Jan. 29, 2018

(65) Prior Publication Data

US 2018/0260178 A1   Sep. 13, 2018

(30) Foreign Application Priority Data

Mar. 8, 2017 (JP) .................. 2017-043870

(51) Int. Cl.
| | | |
|---|---|---|
| *G06F 15/00* | (2006.01) | |
| *G06F 3/12* | (2006.01) | |
| *G06F 21/60* | (2013.01) | |
| *H04N 1/44* | (2006.01) | |

(52) U.S. Cl.
CPC .......... *G06F 3/1273* (2013.01); *G06F 3/1296* (2013.01); *G06F 21/608* (2013.01); *H04N 1/4413* (2013.01); *H04N 2201/0094* (2013.01)

(58) Field of Classification Search
CPC .... G06F 3/1273; G06F 3/1296; G06F 21/608; H04N 2201/0094; H04N 1/4413
USPC ....................................... 358/1.15
See application file for complete search history.

(56) References Cited

U.S. PATENT DOCUMENTS

| | | | |
|---|---|---|---|
| 2009/0316175 A1* | 12/2009 | Wang | H04N 1/00233 358/1.13 |
| 2011/0102834 A1* | 5/2011 | Makishima | G06F 3/1222 358/1.15 |
| 2012/0120451 A1 | 5/2012 | Ikegami et al. | |
| 2016/0105568 A1 | 4/2016 | Yamashita | |

FOREIGN PATENT DOCUMENTS

| | | |
|---|---|---|
| JP | 2005-094129 | 4/2005 |
| JP | 2007-240614 | 9/2007 |

* cited by examiner

*Primary Examiner* — Saeid Ebrahimi Dehkordy
(74) *Attorney, Agent, or Firm* — IPUSA, PLLC

(57) ABSTRACT

A usage record compiling system including an image forming apparatus is provided. The usage record compiling system includes a first processor configured to perform authentication for enabling a user to use the image forming apparatus and transmit history information relating to usage of the image forming apparatus by the user during a period in which the authentication is valid, a second processor configured to receive the history information from the first processor and calculate a usage record value based on the received history information, store the calculated usage record value in a first storage unit, update the calculated usage record value stored in the first storage unit, and store update information indicating that the calculated usage record value has been updated in a second storage unit.

15 Claims, 15 Drawing Sheets

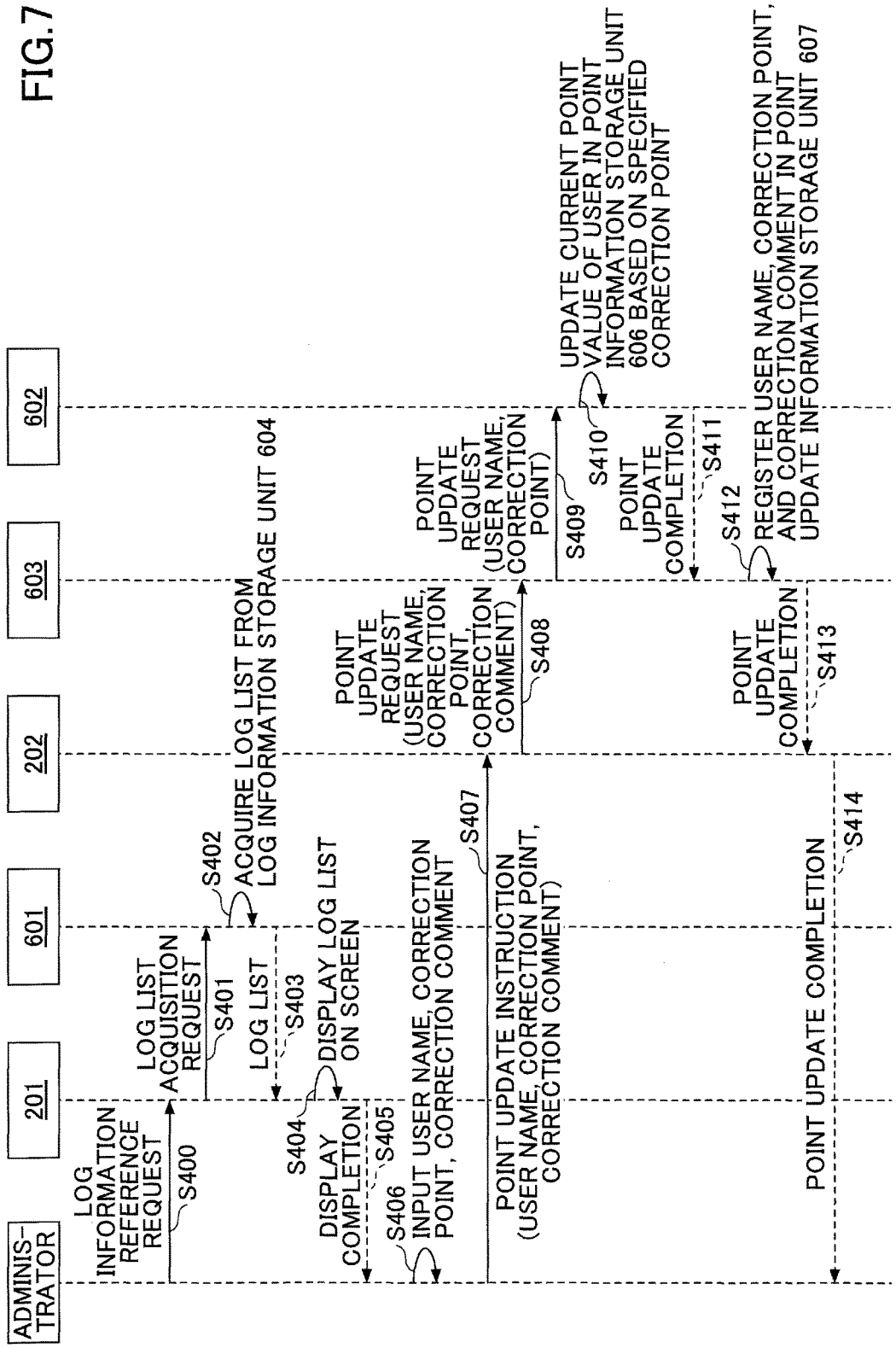

FIG.8

■ USER USAGE HISTORY LIST

| OPERATION DATE/TIME | LOG TYPE | USER NAME | COLOR/ MONOCHROME | QUANTITY |
|---|---|---|---|---|
| 10/30 5:00:00 pm | COPY | tanaka | MONOCHROME | 10 |
| 10/30 6:00:00 pm | PRINT | tanaka | COLOR | 2 |
| 10/31 7:00:00 pm | PRINT | yamada | MONOCHROME | 3 |
| 10/31 7:30:00 pm | COPY | yamada | MONOCHROME | 5 |
| 11/1 2:00:00 pm | COPY | saitoh | COLOR | 2 |
| 11/1 3:00:00 pm | COPY | saitoh | MONOCHROME | 1 |

■ USER USAGE HISTORY EDIT

USER NAME [tanaka]

CORRECTION POINT [-10] (POINTS WILL BE RETURNED BY ENTERING A NEGATIVE VALUE)

CORRECTION COMMENT [USER COMPLAINT]

FIG.10

■ USER USAGE HISTORY LIST

PLEASE SELECT JOB SUBJECT TO POINT CORRECTION.

| OPERATION DATE/TIME | LOG TYPE | USER NAME | COLOR/ MONOCHROME | QUANTITY |
|---|---|---|---|---|
| ▲ 10/30 5:00:00 pm | COPY | tanaka | MONOCHROME | 10 |
| 10/30 6:00:00 pm | PRINT | tanaka | COLOR | 2 |
| 10/31 7:00:00 pm | PRINT | yamada | MONOCHROME | 3 |
| 10/31 7:30:00 pm | COPY | yamada | MONOCHROME | 5 |
| 11/1 2:00:00 pm | COPY | saitoh | COLOR | 2 |
| 11/1 3:00:00 pm | COPY | saitoh | MONOCHROME | 1 |

■ USER USAGE HISTORY EDIT

CORRECTION COMMENT  [ USER COMPLAINT ]

[ RETURN POINTS OF SELECTED JOB ]

FIG.12

■ USER USAGE HISTORY LIST

PLEASE SELECT JOB SUBJECT TO POINT CORRECTION.

| OPERATION DATE/TIME | LOG TYPE | USER NAME | COLOR/ MONOCHROME | QUANTITY |
|---|---|---|---|---|
| ▲ 10/30 5:00:00 pm | COPY | tanaka | MONOCHROME | 10 |
| 10/30 6:00:00 pm | PRINT | tanaka | COLOR | 2 |
| 10/31 7:00:00 pm | PRINT | yamada | MONOCHROME | 3 |
| 10/31 7:30:00 pm | COPY | yamada | MONOCHROME | 5 |
| 11/1 2:00:00 pm | COPY | saitoh | COLOR | 2 |
| 11/1 3:00:00 pm | COPY | saitoh | MONOCHROME | 1 |

■ USER USAGE HISTORY EDIT

REDUCTION RATE  [ 50 ] %

CORRECTION COMMENT  [ USER COMPLAINT ]

[ RETURN POINTS OF SELECTED JOB AT SPECIFIED RATE ]

FIG.14

USAGE RECORD REPORT

OCTOBER

| USER NAME | USED POINT | CORRECTION POINT | FINALIZED POINT | REMARK |
|---|---|---|---|---|
| tanaka | 20 | −10 | 10 | 10/30 CORRECTION DUE TO USER COMPLAINT (admin) |
| yamada | 8 | 0 | 8 | |

NOVEMBER

| USER NAME | USED POINT | CORRECTION POINT | FINALIZED POINT | REMARK |
|---|---|---|---|---|
| saitoh | 20 | −20 | 1 | 11/1 CORRECTION DUE TO ERRONEOUS OUTPUT OPERATION (admin) |

USAGE RECORD COMPILING SYSTEM AND USAGE RECORD COMPILING METHOD

CROSS-REFERENCE TO RELATED APPLICATIONS

The present application claims priority under 35 U.S.C. § 119 to Japanese Patent Application No. 2017-043870 filed on Mar. 8, 2017, the entire contents of which are incorporated herein by reference.

BACKGROUND OF THE INVENTION

1. Field of the Invention

The present invention relates to a usage record compiling system and a usage record compiling method.

2. Description of the Related Art

There are techniques that can be implemented in a print charging system using an image forming apparatus for processing a user complaint by enabling a user to report a problem with the image forming apparatus when there is a problem in the print result of a print operation executed by the user (see, e.g., Japanese Unexamined Patent Publication No. 2005-094129).

However, when a user uses an image forming apparatus, cases may arise in which a print job that is different from that contemplated by the user is executed or a print result inconsistent with the expectations of the user is obtained through no fault of the user, for example. In such cases, the user typically ends up making a payment or consuming points for an unsatisfactory print result. Also, even when the user is given a refund by making a complaint, usage history information of the user that is managed by the print charging system is not changed, and the fact that the user was given a refund could not be reflected in the usage history information.

SUMMARY OF THE INVENTION

An aspect of the present invention is directed to providing a usage record compiling system that enables editing and compiling of usage history information that records a usage outcome that was not anticipated by a user.

According to one embodiment of the present invention, a usage record compiling system including an image forming apparatus is provided. The usage record compiling system includes a first processor configured to perform authentication for enabling a user to use the image forming apparatus and transmit history information relating to usage of the image forming apparatus by the user during a period in which the authentication is valid, a second processor configured to receive the history information from the first processor and calculate a usage record value based on the received history information, store the calculated usage record value in a first storage unit, update the calculated usage record value stored in the first storage unit, and store update information indicating that the calculated usage record value has been updated in a second storage unit.

BRIEF DESCRIPTION OF THE DRAWINGS

FIG. 7 is a sequence chart illustrating a first example process in which an administrator updates points according to an embodiment of the present invention;

FIG. 8 is a diagram illustrating a first example screen display of an administrator apparatus according to an embodiment of the present invention;

FIG. 10 is a diagram illustrating a second example screen display of the administrator apparatus according to an embodiment of the present invention;

FIG. 12 is a diagram illustrating a third example screen display of the administrator apparatus according to an embodiment of the present invention;

FIG. 14 is a diagram illustrating an example of a report generated by the usage record compiling system according to an embodiment of the present invention.

DESCRIPTION OF THE EMBODIMENTS

In the following, embodiments of the present invention are described with reference to the accompanying drawings.

Figure 1:
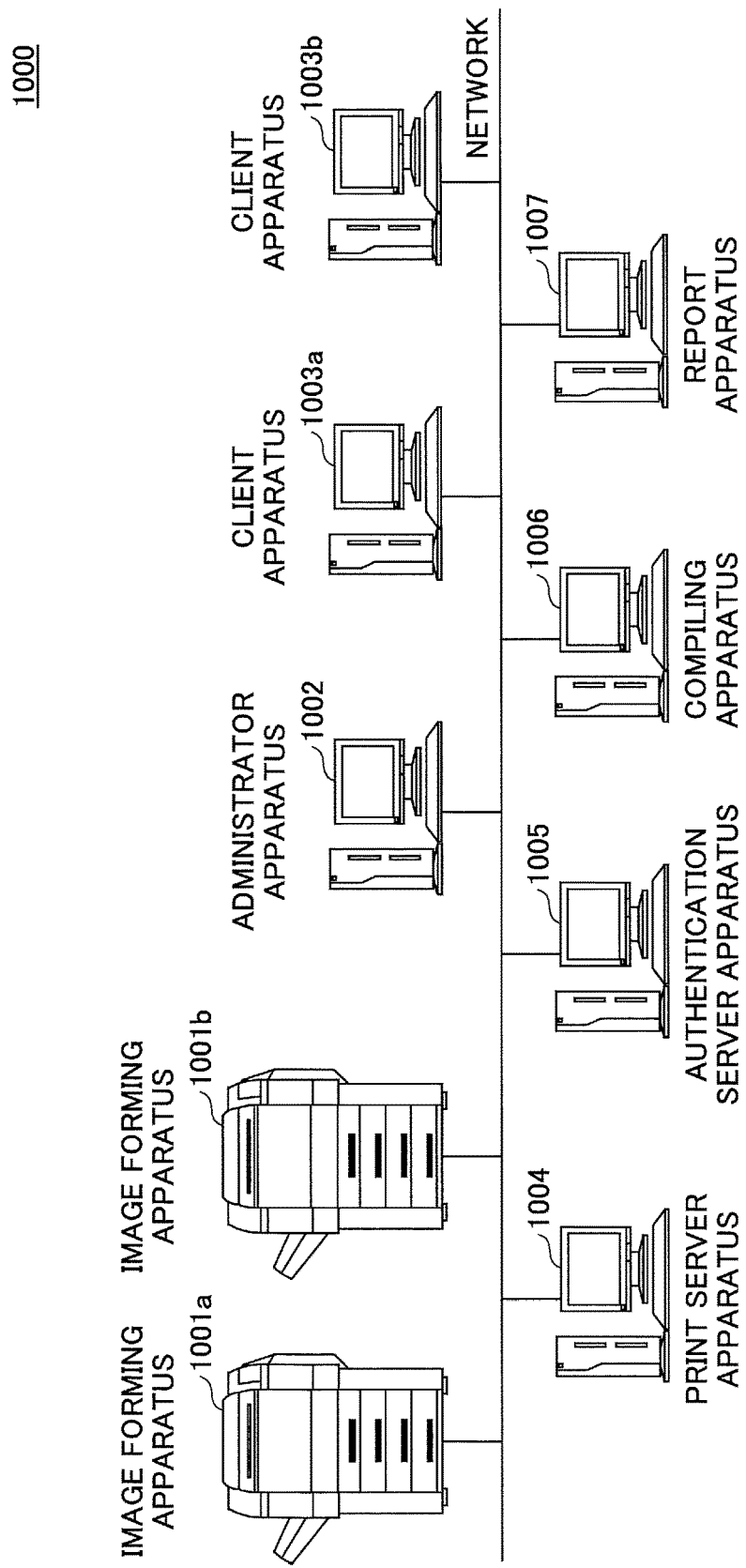
FIG. 1 is a diagram illustrating an example configuration of a usage record compiling system according to an embodiment of the present invention.

FIG. 1 is a diagram illustrating an example configuration of a usage record compiling system 1000 according to an embodiment of the present invention. In FIG. 1, the usage record compiling system 1000 includes an image forming apparatus 1001*a*, an image forming apparatus 1001*b*, an administrator apparatus 1002, a client apparatus 1003*a*, a client apparatus 1003*b*, a print server apparatus 1004, an authentication server apparatus 1005, a compiling apparatus 1006, and a report apparatus 1007 that are connected to each other via a network. Note that in some embodiments, two or more of the above apparatuses may be configured by one common server computer, for example. Also, one or more of the above apparatuses may be configured by a plurality of server computers, for example.

The image forming apparatus 1001*a* and the image forming apparatus 1001*b* (generically referred to as "image forming apparatus 1001" hereinafter unless they are to be distinguished from each other) may be a printer, a facsimile, a scanner, or an MFP (Multi-Function Peripheral), for example. A variety of application software (hereinafter referred to as "applications") is installed in the image forming apparatus 1001, and these applications execute operations, such as authentication, printing, copying, log transmission, and the like. The image forming apparatus 1001 also includes a user interface.

The administrator apparatus 1002 may be a PC (Personal Computer) or the like that is operated by an administrator that manages the usage record compiling system 1000. The administrator apparatus 1002 performs operations, such as displaying a user's log list, updating a user's points, and the like. Note that in the present description, the quantity of printing that can be executed by a user of the usage record compiling system 1000 using the image forming apparatus 1001 is represented by points (point value). The usage record compiling system 1000 may retain a current point value and an upper limit point value for each user, for example. When a user executes a print operation, the current point value of the user may be incremented accordingly. When the current point value reaches the upper limit point value for the user, the user may no longer be able to perform a print operation.

The client apparatus 1003*a* and the client apparatus 1003*b* (generically referred to as "client apparatus 1003" hereinafter unless they are to be distinguished from each other) may be a PC or the like that is operated by a user using the usage record compiling system 1000. The client apparatus 1003 receives an input from a user and transmits a job to the print server apparatus 1004. Note that a job is used to instruct execution of a print operation for printing a document designated by a user.

The print server, apparatus 1004 may be implemented by a server computer, for example, and is configured to store a job received from the client apparatus 1003 and transmit a job list in response to a request from the image forming apparatus 1001.

The authentication server apparatus 1005 may be implemented by a server computer, for example, and is configured to authenticate a user. The authentication server apparatus 1005 includes user information and transmits relevant user information in response to a request.

The compiling apparatus 1006 may be implemented by a server computer, for example, and is configured to manage logs and points of a user based on logs transmitted from the image forming apparatus 1001.

The report apparatus 1007 may be implemented by a server computer, for example, and is configured to generate a document relating to usage records of a user using the image forming apparatus 1001 in a predetermined format based on the logs managed by the compiling apparatus 1006.

Figure 2:
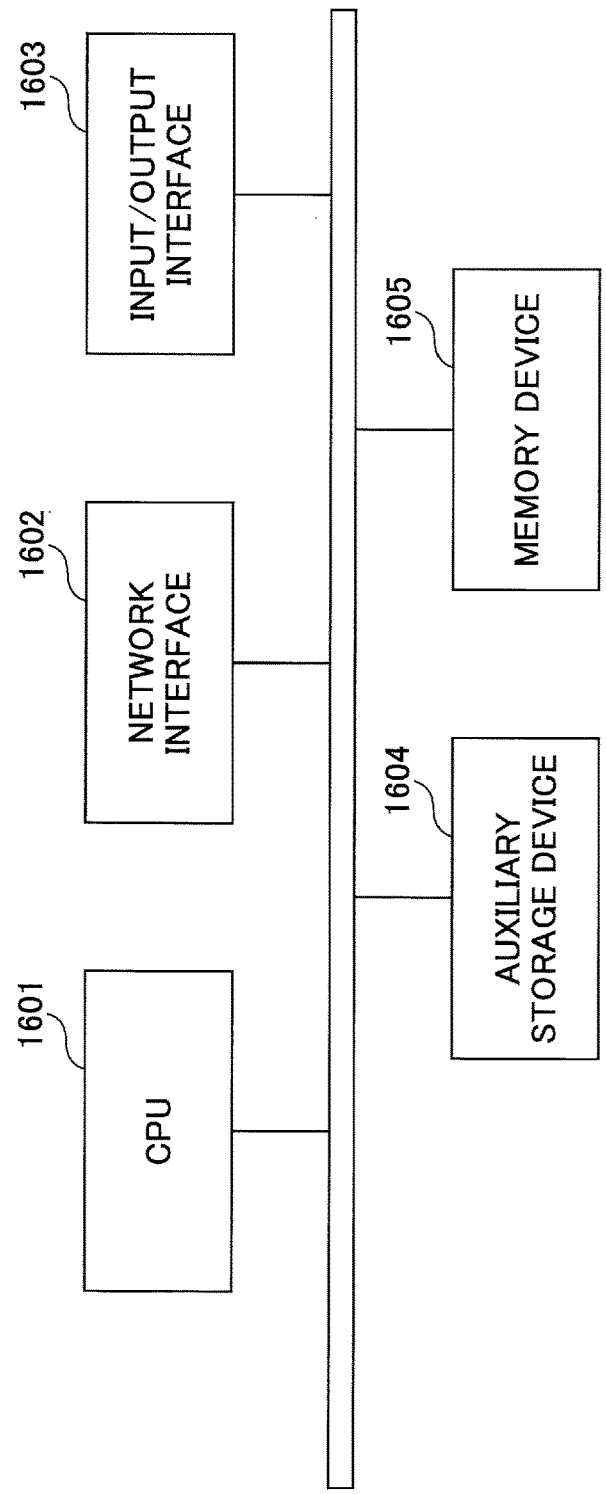
FIG. 2 is a diagram illustrating an example hardware configuration of a compiling apparatus according to an embodiment of the present invention.

FIG. 2 is a diagram illustrating an example hardware configuration of the compiling apparatus 1006 according to an embodiment of the present invention. In FIG. 2, the compiling apparatus 1006 includes a CPU (Central Processing Unit) 1601, a network interface 1602, an input/output interface 1603, an auxiliary storage device 1604, and a memory device 1605 that are connected to each other.

The auxiliary storage device 1604 stores programs for executing processes in the compiling apparatus 1006. The auxiliary storage device 1604 also stores files and data necessary for executing the installed programs. The auxiliary storage device 1604 may be a computer-readable recording medium, for example.

The memory device 1605 reads a program from the auxiliary storage device 1604 and stores the program in response to an instruction to activate the program. The CPU 1601 implements functions of the compiling apparatus 1006 by executing one or more programs stored in the memory device 1605.

The network interface 1602 may be a wired or wireless interface that is used for communicating with the image forming apparatus 1001, for example.

The input/output interface 1603 is an interface for establishing connection with various input/output devices, such as a USB (Universal Serial Bus) device, hardware keys, a status notification LED, a liquid crystal display, a touch panel, and the like.

Note that the image forming apparatus 1001, the administrator apparatus 1002, the client apparatus 1003, the print server apparatus 1004, the authentication server apparatus 1005, and the report apparatus 1007 may have hardware configurations substantially identical to the hardware configuration illustrated in FIG. 2, for example. Note, however, that the image forming apparatus 1001 may further include a scanner corresponding to hardware for scanning a document and acquiring image data of the document and a printer corresponding to hardware for printing print data on a printing medium such as paper, for example.

Figure 3:
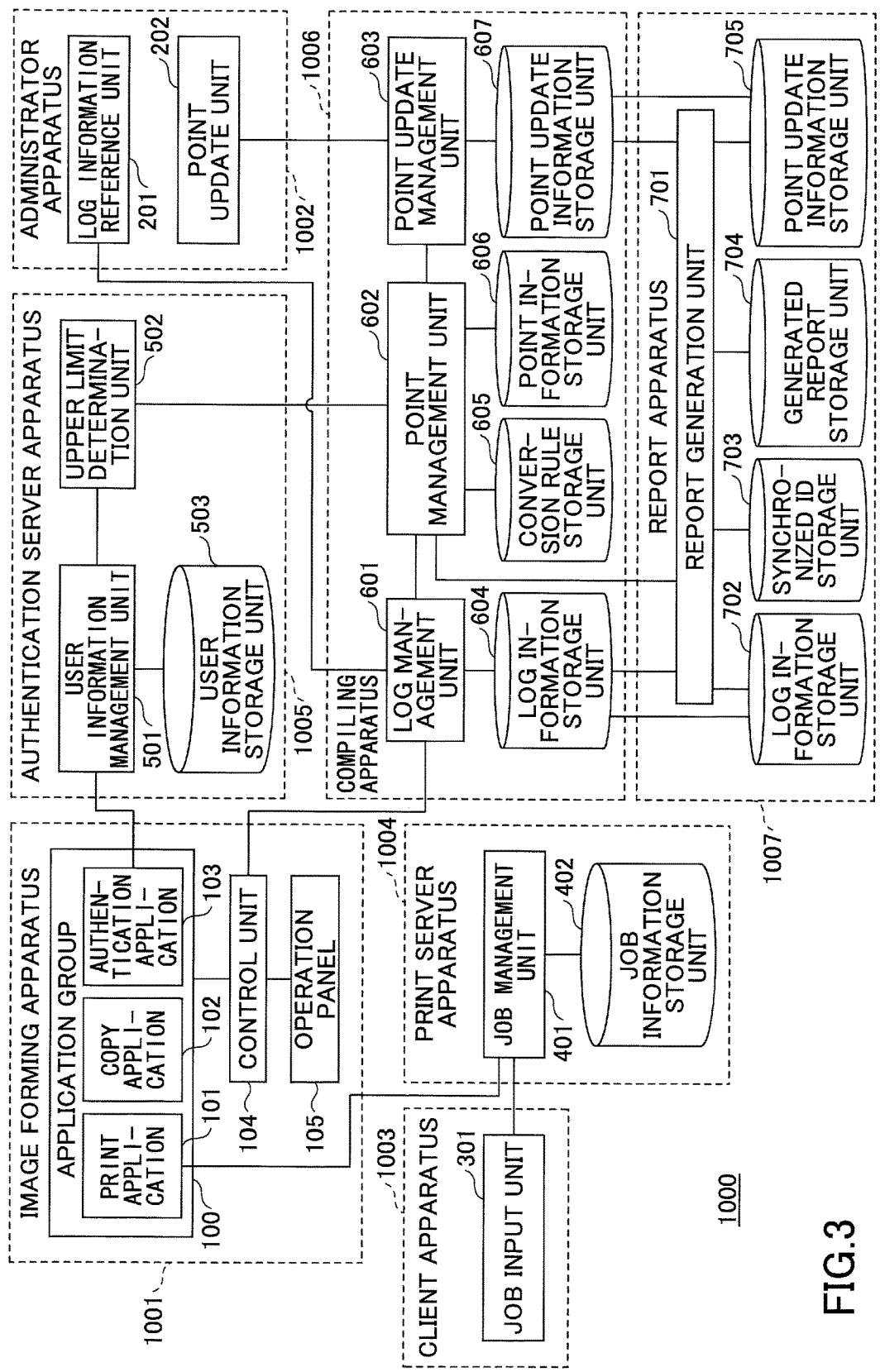
FIG. 3 is a diagram illustrating an example functional configuration the usage record compiling system according to an embodiment of the present invention.

FIG. 3 is a diagram illustrating an example functional configuration of the usage record compiling system 1000 according to an embodiment of the present invention. In FIG. 3, the image forming apparatus 1001 includes an application group 100 including a print application 101, a copy application 102, and an authentication application 103. The applications included in the application group 100 can exchange data with each other. The image forming apparatus 1001 also includes a control unit 104 and an operation panel 105. These units may be implemented by the CPU 1601 of the image forming apparatus 1001 executing processes based on one or more programs installed in the image forming apparatus 1001, for example. Further, the operation panel 105 may be implemented by the input/output interface 1603, for example.

The print application 101 communicates with the print server apparatus 1004 to check jobs that have been previously submitted by a user using the image forming apparatus 1001 and implements operations such as prompting the user to select a job to be executed, for example. The copy application 102 enables the user using the image forming apparatus 1001 to execute a copy operation. The authentication application 103 communicates with the authentication server apparatus 1005 and authenticates the user using the image forming apparatus 1001. The authentication application 103 also transmits a usage record of the user using the image forming apparatus 1001 as a log to the compiling apparatus 1006 via the control unit 104. The control unit 104 controls data exchanged between the operation panel 105 and the application group 100. The control unit 104 also transmits data received from the application group 100 to the other apparatuses in the usage record compiling system 1000. Further, the control unit 104 has a function of executing a print operation based on a request from the application group 100. The operation panel 105 is a user interface that receives an operation input by a user, outputs data to the control unit 104, and displays information to the user based on data received from the control unit 104.

Also, in FIG. 3, the administrator apparatus 1002 includes a log information reference unit 201 and a point update unit 202. These units may be implemented by the CPU 1601 of the administrator apparatus 1002 executing processes based on one or more programs installed in the administrator apparatus 1002, for example.

The log information reference unit 201 displays a log list based on information acquired from a log management unit 601 of the compiling apparatus 1006. The point update unit 202 transmits a point update request for updating a user's points to a point update management unit 603 of the compiling apparatus 1006.

Also, in FIG. 3, the client apparatus 1003 includes a job input unit 301. The job input unit 301 may be implemented by the CPU 1601 of the client apparatus 1003 executing a process based on one or more programs installed in the client apparatus 1003, for example.

The job input unit 301 accepts a print operation from a user and transmits a job to a job management unit 401 of the print server apparatus 1004.

Also, in FIG. 3, the print server apparatus 1004 includes the job management unit 401 and a job information storage unit 402. These units may be implemented by the CPU 1601 of the print server apparatus 1004 executing processes based on one or more programs installed in the print server apparatus 1004, for example. The job information storage unit 402 may also be implemented by the auxiliary storage device 1604 or the memory device 1605, for example.

The job management unit 401 causes the job information storage unit 402 to store a job received from the job input unit 301 of the client apparatus 1003. Further, in response to a request from the print application 101 of the image forming apparatus 1001, the job management unit 401 transmits a job list and job details. The job information storage unit 402 stores jobs input by the job management unit 401.

Also, in FIG. 3, the authentication server apparatus 1005 includes a user information management unit 501, an upper limit determination unit 502, and a user information storage unit 503. These units may be implemented by the CPU 1601 of the authentication server apparatus 1005 executing processes based on one or more programs installed in the authentication server device 1005, for example. The user information storage unit 503 may also be implemented by the auxiliary storage device 1604 or the memory device 1605, for example.

The user information management unit 501 performs user authentication and provides user information based on a request from the image forming apparatus 1001. In some embodiments, the user information management unit 501 may perform user authentication by communicating with a server having an external authentication function that is not included in the usage record compiling system 1000, for example. The upper limit determination unit 502 queries the point management unit 602 of the compiling apparatus 1006 about information relating to a user's points and determines whether the user's current point value has reached the upper limit point value for the user. The user information storage unit 503 stores user information input by the user information management unit 501. Also, the user information stored in the user information storage unit 503 is read by the user information management unit 501.

Also, in FIG. 3, the compiling apparatus 1006 includes the log management unit 601, the point management unit 602, the point update management unit 603, a log information storage unit 604, a conversion rule storage unit 605, a point information storage unit 606, and a point update information storage unit 607. These units may be implemented by the CPU 1601 of the compiling apparatus 1006 executing processes based on one or more programs installed in the compiling apparatus 1006, for example. Also, the log information storage unit 604, the conversion rule storage unit 605, the point information storage unit 606, and the point update information storage unit 607 may further be implemented by the auxiliary storage device 1604 or the memory device 1605, for example.

The log management unit 601 receives from the control unit 104 of the image forming apparatus 1001, a log relating to usage of the image forming apparatus 1001 by a user. The log may include information identifying the user, the date/time of usage, the function(s) used, and a print quantity, for example. The log management unit 601 stores the received log in the log information storage unit 604. Also, the log management unit 601 has a function of searching through logs to find relevant information. For example, the log management unit 601 can search for the quantity of printing executed by a certain user that has used the image forming apparatus 1001 over a certain period of time. The point management unit 602 calculates a point value of a certain user, based on a log of the certain user stored in the log information storage unit 604 and point rule information stored in the conversion rule storage unit 605, and stores the calculated point value in the point information storage unit 606. The point rule information is used to determine consumed points based on information such as the print quantity included in a target log. The point management unit 602 updates the current point value of a user that is stored in the point information storage unit 606 by adding the calculated point value to the current point value. The point update management unit 603 requests the point update unit 602 to update the current point value of a user in response to a request from the point update unit 202 of the administrator apparatus 1002 and stores point update information relating to the updating of points in the point update information storage unit 607. The log information storage unit 604 stores a log input by the log management unit 601. The conversion rule storage unit 605 stores point rule information for determining consumed points based on information such as the print quantity included in a target log. The point information storage unit 606 stores a point value input by the point management unit 602. The point update information storage unit 607 stores point update information relating to an updating of points based on a request from the point update unit 202 of the administrator apparatus 1002.

Also, in FIG. 3, the report apparatus 1007 includes a report generation unit 701, a log information storage unit 702, a synchronized ID storage unit 703, a generated report storage unit 704, and a point update information storage unit 705. These units may be implemented by the CPU 1601 of the report apparatus 1007 executing processes based on one or more programs installed in the report apparatus 1007, for example. Also, the log information storage unit 702, the synchronized ID storage unit 703, the generated report storage unit 704, and the point update information storage unit 705 may further be implemented by the auxiliary storage device 1604 or the memory device 1605, for example.

The report generation unit 701 generates a report based on information stored in the log information storage unit 702 and the point update information storage unit 705. A report refers to a document obtained by compiling logs and point update information associated with a certain user into a predetermined format. The log information storage unit 702 stores a copy of the data stored in the log information storage unit 604 of the compiling apparatus 1006. The synchronized ID storage unit 703 stores information for determining whether the log information storage unit 702 or the point update information storage unit 705 has copied data from the log information storage unit 604 or the point update information storage unit 607 of the compiling apparatus 1006.

The generated report storage unit 704 stores a report that has been generated by the report generation unit 701. The stored report may be checked by the administrator of the usage history totaling system 1000 from time to time, for example. The point update information storage unit 705 stores a copy of the data stored in the point update information storage unit 607 of the compiling apparatus 1006.

Figure 4:
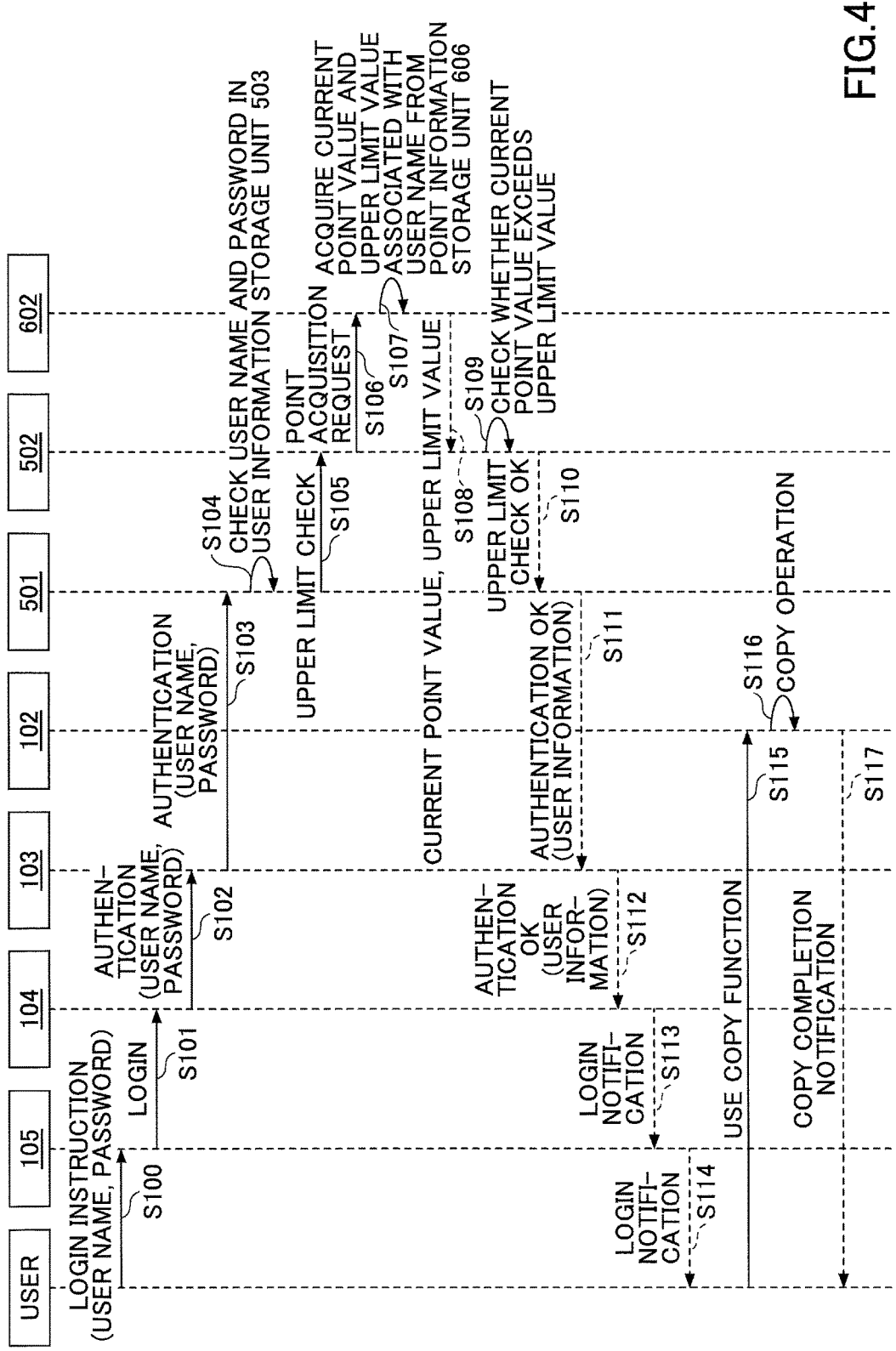
FIG. 4 is a sequence chart illustrating an example process in which a user logs in to the usage record compiling system according to an embodiment of the present invention.

FIG. 4 is a sequence chart illustrating an example process in which a user logs in to the usage record compiling system 1000 according to an embodiment of the present invention. Note that in the following description, a time period during which authentication is valid refers to a time period from when the user logs in to the usage record compiling system 1000 until the user logs out.

In step S100, a user inputs a login instruction including a user name and a password to the operation panel 105. Then, the operation panel 105 transmits the login instruction to the control unit 104 (step S101). Then, the control unit 104 transmits the login instruction to the authentication application 103 (step S102).

In step S103, the authentication application 103 transmits the login instruction to the user information management unit 501. The user information management unit 501 verifies the user name and password included in the login instruction by checking whether the user name and password are stored in the user information storage unit 503 (step S104). Table 1 below represents an example of information stored in the user information storage unit 503.

TABLE 1

| USER NAME | PASSWORD |
| --- | --- |
| tanaka | ******** |
| yamashita | ******** |
| yamada | ******** |
| saitoh | ******** |

As illustrated in the above Table 1, a user name and a password for each user are stored in association with each other in the user information storage unit 503. If the verification performed by the user information management unit 501 in step S104 is successful, the process proceeds to step S105. If the verification performed by the user information management unit 501 in step S104 results in failure, the present process is ended. Note that in some embodiments, when the verification results in failure, a notification of the verification failure may be displayed on a screen, for example.

In step S105, the user information management unit 501 transmits an upper limit check request to the upper limit determination unit 502 for checking the upper limit of points that can be consumed by the user. Specifically, the upper limit check involves comparing the user's current point value with the upper limit point value for the user and checking whether the current point value has reached the upper limit point value. Upon receiving the upper limit check request, the upper limit determination unit 502 requests the point management unit 602 to acquire the current point value of the user (step S106). In turn, the point management unit 602 acquires the current point value and the upper limit point value for the user from the point information storage unit 606 (step S107). Table 2 below represents an example of information stored in the point information storage unit 606.

TABLE 2

| USER NAME | CURRENT POINT VALUE | UPPER LIMIT POINT VALUE |
| --- | --- | --- |
| tanaka | 100 | 1000 |
| yamashita | 2000 | 2000 |
| yamada | 500 | 1000 |
| saitoh | 1000 | 2000 |

As illustrated in the above Table 2, the current point value and the upper limit point value for each user are stored in the point information storage unit 606. For example, when an upper limit check is conducted with respect to points of the user "tanaka" in Table 2, it can be determined that the current point value of the user "tanaka" is "100" and the upper limit point value of the user "tanaka" is "1000", meaning 900 points are still available. Thus, the upper limit check for the user "tanaka" may be determined to be successful. Also, for example, when an upper limit check is conducted with respect to points of the user "yamashita" in Table 2, it can be determined that the current point value of the user "yamashita" is "2000" and the upper limit point value of the user "yamashita" is "2000", meaning 0 points are available. Thus, the upper limit check for the user "yamashita" may be determined to be a failure.

In step S108, the point management unit 602 transmits the acquired current point value and upper limit point value for the user to the upper limit determination unit 502. Then, the upper limit determination unit 502 determines whether the upper limit check is a success or a failure based on the acquired current point value and upper limit point value for the user (step S109). If the upper limit check is successful, the process proceeds to step S110, and if the upper limit check fails, the present process is ended. Note that in some embodiments, when the upper limit check ends in failure, the operation panel 105 may display a screen indicating that the upper limit check has failed, for example.

In step S110, the upper limit determination unit 502 notifies the user information management unit 501 that the upper limit check has been successful. Then, the user information management unit 501 notifies the authentication application 103 that the authentication has been successful (step S111). The notification may include user information identifying the user, for example. Then, the authentication application 103 transmits the notification to the control unit 104 (step S112). Then, the control unit 104 transmits the notification to the operation panel 105 (step S113). Then, the operation panel 105 displays a screen notifying the user that the login operation has been successful (step S114).

In step S115, the user is able to use the copy function of the image forming apparatus 1001 as a result of the successful authentication. In step S116, the copy application 102 executes a copy operation, and in step S117, the user is notified of the completion of the copy operation via the operation panel 105. By implementing the above-described process operations, the process of the user logging in to the usage record compiling system 1000 may be completed.

Figure 5:
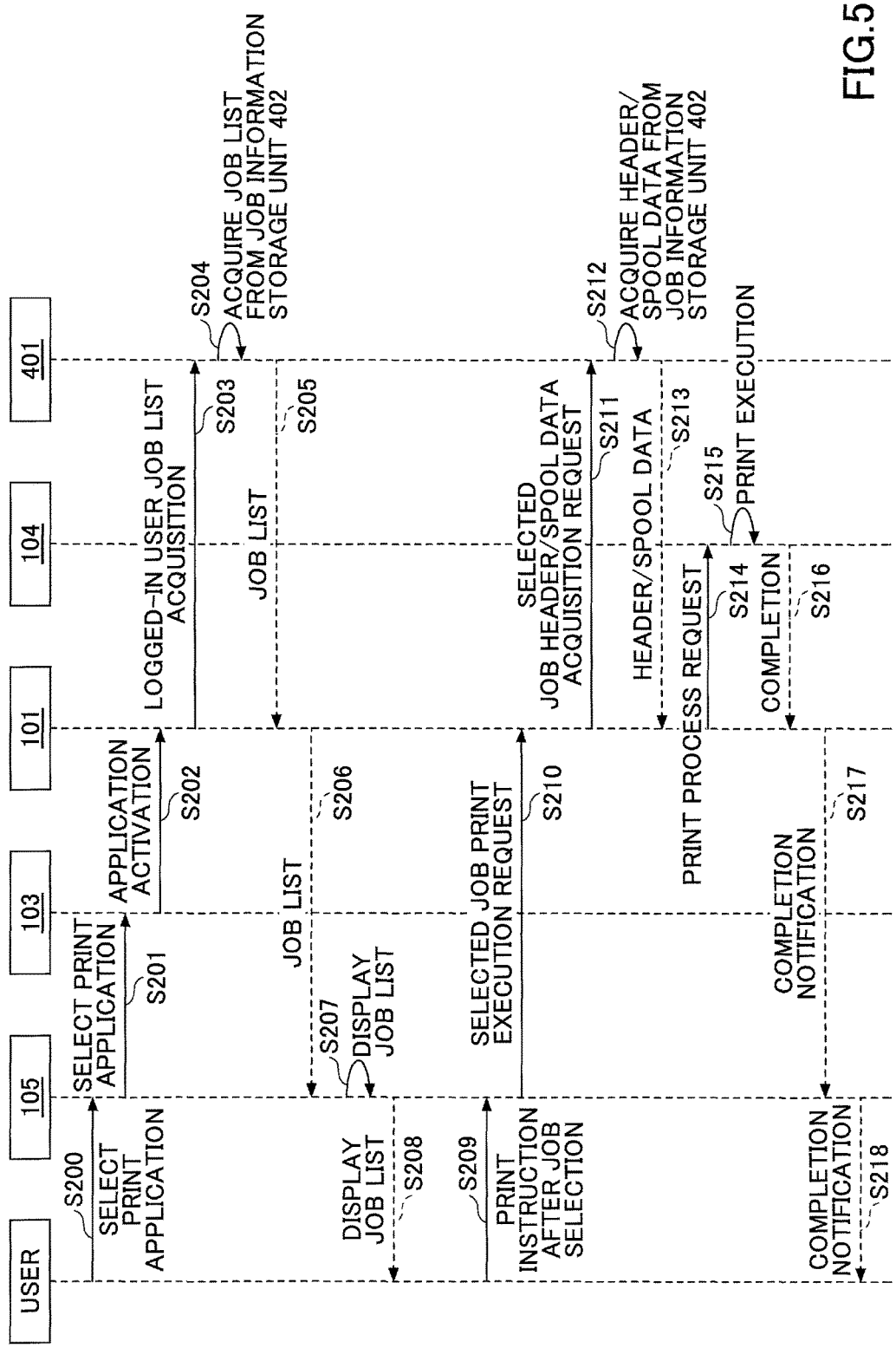
FIG. 5 is a sequence chart illustrating an example process in which a user performs a print operation in the usage record compiling system according to an embodiment of the present invention.

FIG. 5 is a sequence chart illustrating an example process in which the user executes a print operation in the usage record compiling system 1000 according to an embodiment of the present invention. Note that in the present example, it is assumed that before executing step S200 of FIG. 5, user authentication and login have already been performed by the process operations illustrated in FIG. 4.

In step S200, the user selects the print application 101 via the operation panel 105. In turn, the operation panel 105 notifies the authentication application 103 that the print application 101 has been selected (step S201). Then, the authentication application 103 transmits an application activation instruction and user information of the logged-in user to the print application 101 (step S202).

In step S203, the print application 101 requests the job management unit 401 to acquire a job list for the logged-in user. Then, the job management unit 401 acquires the job list from the job information storage unit 402 (step S204). Table 3 below represents an example of a job list stored in the job information storage unit 402.

TABLE 3

| JOB ID | SPOOL DATE/TIME | USER NAME | HEADER INFORMATION | SPOOL DATA FILE NAME |
|---|---|---|---|---|
| 1 | 10/30 5:00:00 pm | tanaka | ... | 00000001.dat |
| 2 | 10/31 6:00:00 pm | yamada | ... | 00000002.dat |

As illustrated in the above Table 3, the job list stores information items including "job ID", "spool date/time", "user name", "header information", and "spool data file name" for each job. The "job ID" is information identifying a job. The "spool date/time" is the date/time the job was input. The "user name" is information identifying the user that has input the corresponding job. The "header information" is common data to be printed on each sheet of paper. The "spool data file name" is information identifying a file in which data to be printed is stored. The job management unit 401 extracts jobs associated with the logged-in user based on the "user name" in the job list and generates a job list to be transmitted to the print application 101.

In step S205, the job list generated by the job management unit 401 is communicated to the print application 101, which in turn communicates the job list to the operation panel 105 (step S206) so that the operation panel 105 can display the job list to the user (steps S207 and S208).

In step S209, the user selects a job to be executed from the job list displayed on the operation panel 105. Then, the operation panel 105 notifies the print application 101 of the selected job and requests for execution of the selected job (step S210). Then, the print application 101 transmits an acquisition request to the job management unit 401 to acquire header/spool data of the selected job (step S211). Then, the job management unit 401 acquires the requested header/spool data from the job information storage unit 402 (step S212) and transmits the acquired header/spool data to the print application 101 (step S213).

In step S214, the print application 101 transmits a print process request to the control unit 104 based on the received header/spool data. In turn, the control unit 104 controls execution of a print operation based on the received print process request (step S215). When the print operation is completed, the control unit 104 transmits a completion notification to the operation panel 105 via the print application 101 (steps S216 and S217) so that the user may be notified of the completion of the job execution (step S218). By implementing the above-described process operations, the process for enabling the user to execute a print operation in the usage record compiling system 1000 may be completed.

Figure 6:
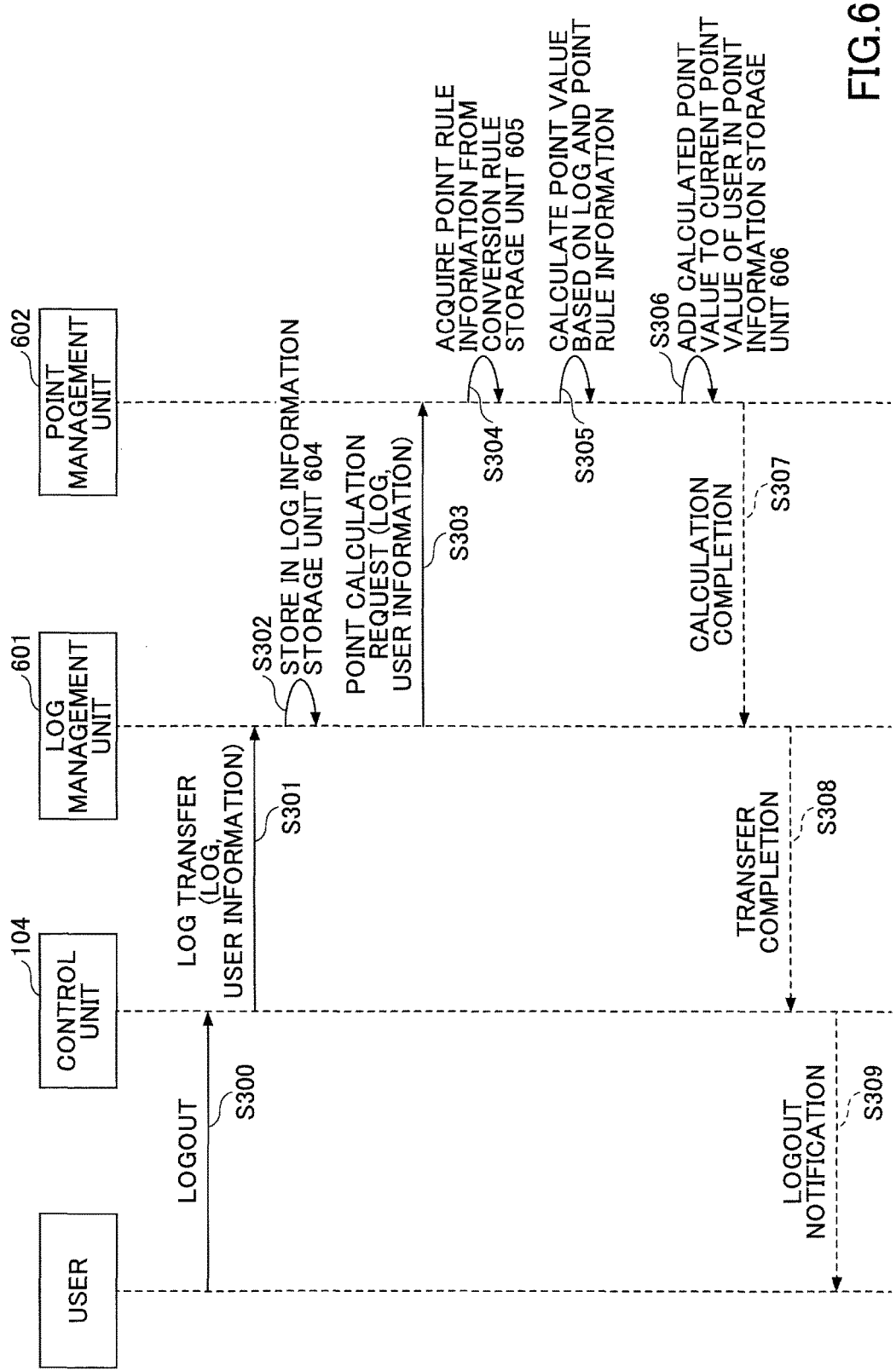
FIG. 6 is a sequence chart illustrating an example process in which a user logs out from the usage record compiling system according to an embodiment of the present invention.

FIG. 6 is a sequence chart illustrating an example process in which the user logs out from the usage record compiling system 1000 according to an embodiment of the present invention. Note that in the present example, it is assumed that before executing step S200 of FIG. 6, user authentication and login have been already been performed by the process operations illustrated in FIG. 4. Note that when the user logs out from the usage record compiling system 1000, the validity period of the user authentication is terminated.

In step S300, the user transmits a logout request to the control unit 104 via the operation panel 105. In turn, the control unit 104 transmits one or more logs relating to usage of the image forming apparatus 1001 by the user while the user was logged in and the user information of the user to the log management unit 601 (step S301). Then, the log management unit 601 stores the received log in the log information storage unit 604 (step S302). Table 4 below represents an example of logs stored in the log information storage unit 604.

TABLE 4

| LOG ID | OPERATION DATE/TIME | LOG TYPE | USER NAME | COLOR/ MONOCHROME | QUANTITY |
|---|---|---|---|---|---|
| 1 | 10/30 5:00:00 pm | COPY | tanaka | MONOCHROME | 10 |
| 2 | 10/30 6:00:00 pm | PRINT | tanaka | COLOR | 2 |
| 3 | 10/31 7:00:00 pm | PRINT | yamada | MONOCHROME | 3 |
| 4 | 10/31 7:30:00 pm | COPY | yamada | MONOCHROME | 5 |
| 5 | 11/1 2:00:00 pm | COPY | saitoh | COLOR | 2 |
| 6 | 11/1 3:00:00 pm | COPY | saitoh | MONOCHROME | 1 |

As illustrated in the above Table 4, the log information storage unit 604 may store information items including "log ID", "operation date/time", "log type", "user name", "color/ monochrome", and "quantity" for each log in association with each other. The "log ID" is information identifying a specific log. The "operation date/time" is the date and time the process corresponding to the log was executed. The "log type" is the type of the process that was executed. The "user name" is information identifying the user that has used the image forming apparatus 1001. The "color/monochrome" is information indicating whether printing was executed in color mode or monochrome mode. The "quantity" indicates the number of sheets printed. In step S302, the log management unit 601 may add a log to the log information storage unit 604 based on the log received from the control unit 104. Note that one log corresponds to a result of executing one job. That is, when one job is executed, a log ID is issued, and a corresponding log is retained by the control unit 104.

In step S303, the log management unit 601 transmits a point calculation request, together with the log and user information, to the point management unit 602. Then, the point management unit 602 acquires point rule information from the conversion rule storage unit 605 (step S304). Table 5 below represents an example of the point rule information stored in the conversion rule storage unit 605.

TABLE 5

| COLOR PRINT | COLOR COPY | MONOCHROME PRINT | MONOCHROME COPY |
|---|---|---|---|
| 5 | 10 | 1 | 1 |

As illustrated in the above Table 5, the conversion rule storage unit 605 may store corresponding numerical values for the printing methods "color print", "color copy", "monochrome print", and "monochrome copy". The numerical value represents a point value to be consumed per 1 quantity of printing executed by a corresponding printing method determined by the "log type" and the "color/monochrome" of Table 4. Note that the values of the point rule information may be set up based on more detailed printing methods. For example, different values may be set up depending on the number of colors used in printing/copying (e.g., full color, grayscale, black/white binary), or different values may be set up depending on the size of paper used in printing.

In step S305, the point management unit 602 calculates a point value based on the log received from the log management unit 601 and the point rule information acquired from the conversion rule storage unit 605. Then, the point management unit 602 adds the calculated point value to the current point value of the corresponding user in the point information storage unit 606 (step S306).

In the following, example processes of steps S304 to S306 are described. It is assumed below that the point management unit 602 receives the log with the log ID "1" from among the logs included in Table 4 and calculates a point value by applying the point rule information of Table 5. As can be appreciated from Table 4, the "log type" of the log with the log ID "1" is indicated as "copy", the "color/monochrome" is indicated as "monochrome", and the "quantity" is indicated as "10". Also, as can be appreciated from Table 5, the numerical value "1" is assigned for the printing method "monochrome copy". Thus, the numerical value "1" is multiplied by the quantity "10" to obtain the point value 10 as the consumed points. Also, note that in Table 4, "tanaka" is indicated as the "user name" associated with the log with the log ID "1", and according to Table 2, the current point value of the user "tanaka" is "100". Thus, the point management unit 602 adds 10 to 100 to obtain 110 as the point value of "tanaka" and stores the calculated point value in the point information storage unit 606.

In step S307, the point management unit 602 transmits a point calculation completion notification to the log management unit 601. Then, the log management unit 601 transmits a log transfer completion notification to the control unit 104 (step S308). Then, the user receives a logout notification from the control unit 104 via the operation panel 105 (step S309). By implementing the above-described process operations, the process of the user logging out from the usage record compiling system 1000 may be completed.

FIG. 7 is a sequence chart illustrating a first example process in which an administrator updates points according to an embodiment of the present invention. In the process of FIG. 7, the administrator of the usage record compiling system 1000 can change the current point value of a user by checking the usage status of the user based on log information of the user and entering points to be returned to the user in response to a complaint from the user, for example.

In step S400, the administrator transmits a log information reference request to the log information reference unit 201. In turn, the log information reference unit 201 transmits a log list acquisition request to the log management unit 601 (step S401). Then, the log management unit 601 acquires a log list from the log information storage unit 604 (step S402) and transmits the log list to the log information reference unit 201 (step S403).

In step S404, the log information reference unit 201 displays the log list on a screen and notifies the administrator that display of the log list has been completed (step S405).

FIG. 8 is a diagram illustrating a first example screen display of the administrator apparatus 1002 according to an embodiment of the present invention. The screen of FIG. 8 displays a user usage history list section and a user usage history edit section. The user use history list section is obtained by omitting the "log ID" from the log list of Table 4. The user usage history edit section includes input fields for inputting relevant information for "user name", "correction point", and "correction comment" to be specified in a point update instruction, and a "correct" button to be pressed when relevant information is input to the user usage history edit section.

In step S406, the administrator refers to the user usage history list to input relevant information for the "user name", "correction point", and "correction comment" in the user usage history edit section, and presses the "correct" button. For example, in FIG. 8, "tanaka" is input as the "user name", "−10" is input as the "correction point", and "user complaint" is input as "correction comment". Note that the above inputs correspond to a point update operation in which the administrator decrements the current point value of the user with the user name "tanaka" by 10 points.

In step S407, a point update instruction including the input "user name", "correction point" and "correction comment" is transmitted to the point update unit 202. Then, the point update unit 202 transmits a point update request including the contents of the point update instruction to the point update management unit 603 (step S408). Then, based on the point update request, the point update management unit 603 transmits a point update request including the user name and the correction point to the point management unit 602 (step S409). In turn, the point management unit 602 updates the current point value of the user specified in the point update request based on the specified correction point and stores the updated current point value in the point information storage unit 606 (step S410). For example, in the case where the administrator has input information as indicated in FIG. 8 for the "user name", "correction point" and "correction comment" in the user usage history edit section, the current point value of the user with the user name "tanaka" is decremented by 10 points and the resulting point value is stored in the point information storage unit 606.

In step S411, the point management unit 602 transmits an update completion notification specifying the relevant "user name", "correction point" and "correction comment" to the point update management unit 603. In step S412, the point update management unit 603 registers the "user name", "correction point" and "correction comment" specified in the update completion notification in the point update information storage unit 607. Table 6 below represents an example of the point update information stored in the point update information storage unit 607.

TABLE 6

| UP-DATE ID | UPDATE DATE/TIME | USER NAME | CORREC-TION POINT | UP-DATER | UPDATE REASON |
|---|---|---|---|---|---|
| 1 | 10/30 6:00:00 pm | tanaka | −10 | admin | USER COM-PLAINT |
| 2 | 11/1 4:00:00 pm | saitoh | −20 | admin | ERRO-NEOUS OUTPUT OPERA-TION |

As illustrated in the above Table 6, the point update information storage unit 607 may store information items including "update ID", "update date/time", "user name", "correction point", "updater", and "update reason" for each point update instruction. The "update ID" is information identifying a point update instruction. The "update date/time" is the date and time the point update instruction was executed. The "correction point" is the point value added to the current point value. The "updater" is information identifying the administrator that has issued the point update instruction. The "update reason" corresponds to the correction comment included in the point update instruction.

In step S413, the point update management unit 603 transmits a point update completion notification to the point update unit 202, and in step S414, the point update unit 202 notifies the administrator of the point update completion by displaying a screen indicating that the point update operation has been completed. By implementing the above-described process operations, the first example process for enabling the administrator to update points may be completed.

Figure 9:
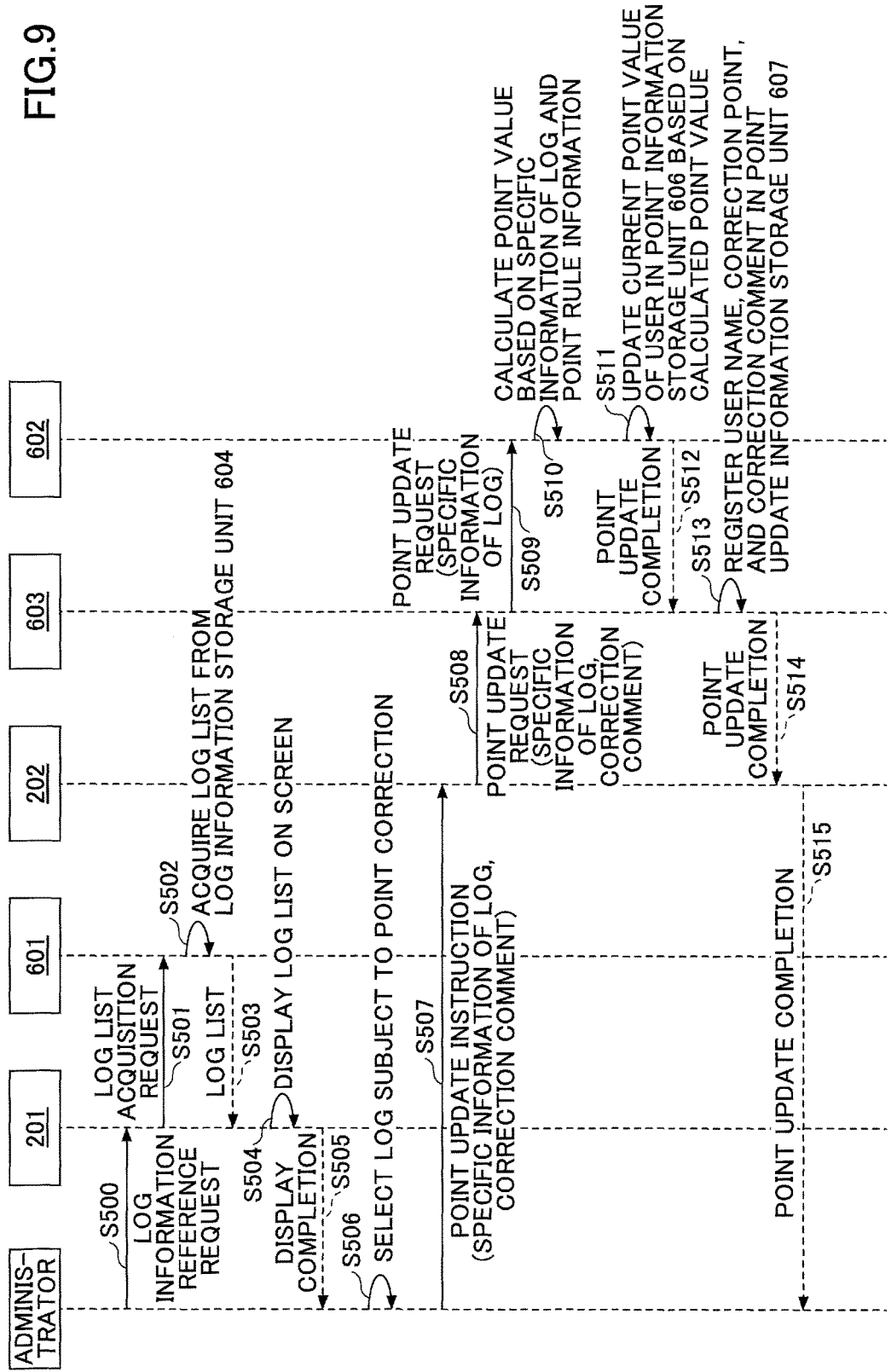
FIG. 9 is a sequence chart illustrating a second example process in which an administrator updates points according to an embodiment of the present invention.

FIG. 9 is a sequence chart illustrating a second example process in which the administrator updates points according to an embodiment of the present invention. In the process of FIG. 9, the administrator of the usage record compiling system 1000 determines points to be returned to a user and changes the current point value of the user by editing a relevant log of a job executed by the user in response to a complaint from the user, for example.

Note that the processes of steps S500 to S503 of FIG. 9 are substantially identical to the processes of steps S400 to S403 of FIG. 7.

In step S504, the log information reference unit 201 displays a log list on a screen, and in step S505, the log information reference unit 201 notifies the administrator that the log list display has been completed.

FIG. 10 is a diagram showing a second example screen display of the administrator apparatus 1002 according to an embodiment of the present invention. The screen of FIG. 10 displays a user usage history list section and a user usage history edit section. The user usage history list is obtained by omitting the "log ID" from the log list of Table 4. The user usage history edit section includes an input field for inputting a "correction comment" to be specified in a point update instruction, and a "return points of selected job" button to be pressed when relevant information is input. Note that in FIG. 10, the user usage history list has a cursor displayed on the left side pointing to (i.e., selecting) the log with the "operation date/time" indicated as "10/30 5:00:00 pm", the "log type" indicated as "copy", the "user name" indicated as "tanaka", the "color/monochrome" indicated as "monochrome", and the "quantity" indicated as "10". Also, in the user usage history edit section, "user complaint" is input as the "correction comment".

In step S506, the administrator selects a relevant job to be subjected to point correction from the user usage history list, changes the value of a relevant information item requiring correction, inputs a correction comment in the user usage history edit section, and presses the "return points of selected job" button. In turn, a point update instruction including specific information of the log of the corrected job and the input correction comment is transmitted to the point update unit 202 (step S507). Then, the point update unit 202 transmits a point update request including the contents of the point update instruction to the point update management unit 603 (step S508). Then, based on the point update request, the point update management unit 603 transmits a point update request including the specific information of the log of the corrected job to the point management unit 602 (step S509). In step S510, the point management unit 602 calculates a point value based on the specific information of the log of the corrected job and the point rule information acquired from the conversion rule storage unit 605. The specific information of the log of the corrected job also includes log information of the job before correction, and in this way, points to be added/subtracted may be determined.

For example, it is assumed below that the administrator has selected from the user usage history list of FIG. 10, the log with the operation date/time "10/30 5:00:00 pm", the log type "copy", the user name "tanaka", the mode "monochrome", and the quantity "10", and has manipulated the selected log to change the quantity from "10" to "7". In this case, the point management unit 602 acquires the information "log type" and "color/monochrome" from the log of the job before correction or the log of the corrected job, acquires the quantity "10" from the log of the job before correction, and acquires the quantity "7" from the log of the corrected job. As a result, the point management unit 602 can determine that the "quantity" of the log of a job with "copy" specified as the "log type" and "monochrome" specified as the "color/monochrome" has been decremented by 3. It can be appreciated from the point rule information of Table 5 that for the printing method "monochrome copy", 1 point is consumed per 1 quantity of printing. Thus, the point management unit 602 can calculate a point value by subtracting "3" from the current point value of the user with the user name "tanaka" and store the calculated point value in the point information storage unit 606.

In step S511, the point management unit 602 updates the current point value of the user specified by the specific information of the log in the point information storage unit 606 based on the calculated point value.

Note that the processes of steps S512 to S515 are substantially identical to the processes of steps S411 to S414 of FIG. 7. By implementing the above-described process operations, the second example process for enabling the administrator to update points may be completed.

Figure 11:
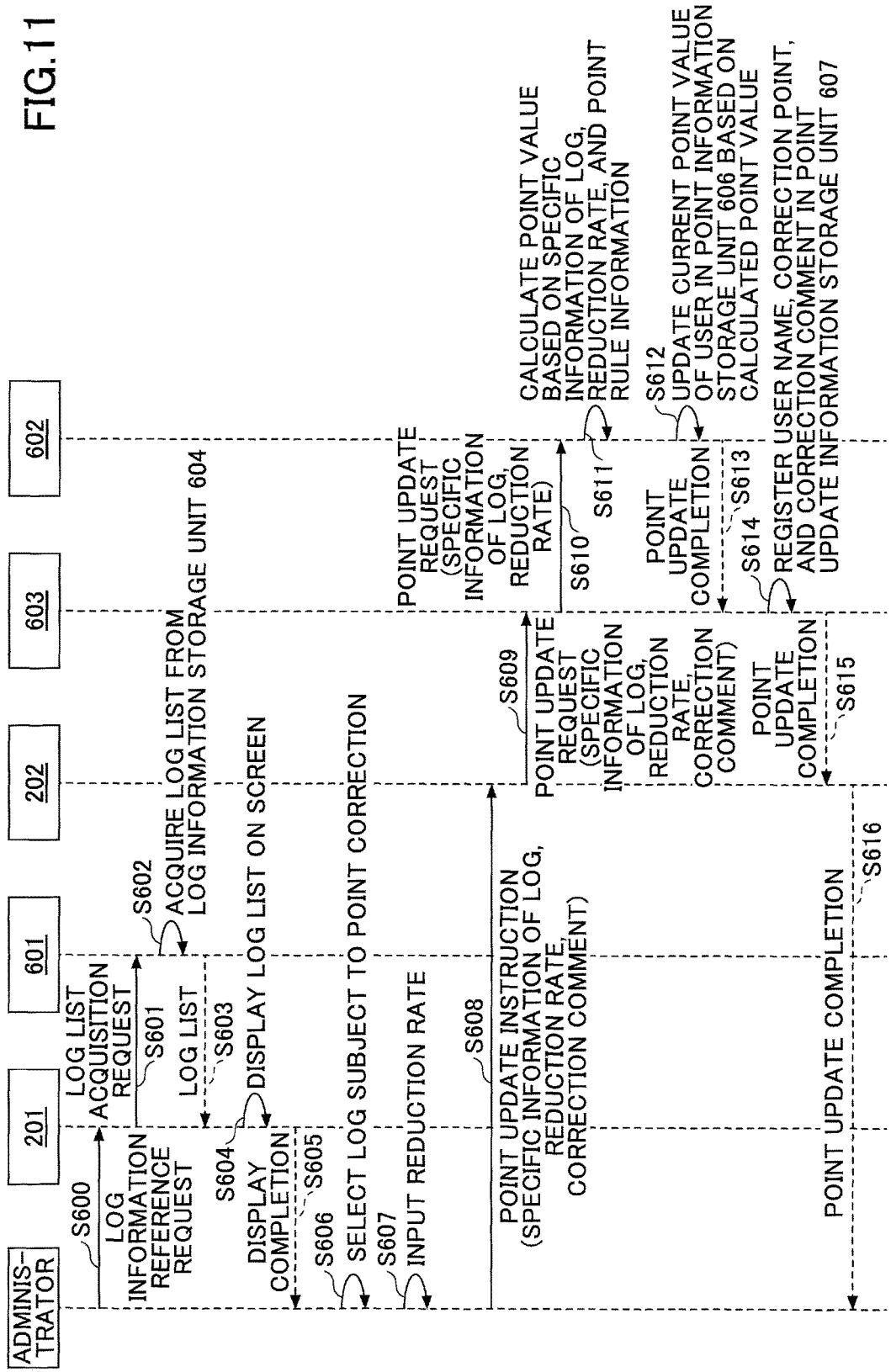
FIG. 11 is a sequence chart illustrating a third example process in which an administrator updates points according to an embodiment of the present invention.

FIG. 11 is a sequence chart illustrating a third example process in which the administrator updates points according to an embodiment of the present invention. In the process of FIG. 11, the administrator of the usage record compiling system 1000 determines points to be returned to a user and changes the current point value of the user by specifying a reduction rate for the "quantity" indicated in a relevant log of a job executed by the user in response to a complaint from the user, for example.

Note that the processes of steps S600 to S603 of FIG. 11 are substantially identical to the processes of steps S400 to 5403 of FIG. 7.

In step S604, the log information reference unit 201 displays a log list on a screen and in step S605, the log information reference unit 201 notifies the administrator that the log list display has been completed.

FIG. 12 is a diagram illustrating a third example screen display of the administrator apparatus 1002 according to an embodiment of the present invention. The screen of FIG. 12 displays a user usage history list section and user usage history edit section. The user usage history list is obtained by omitting the "log ID" from the log list of Table 4. The user usage history edit section includes input fields for inputting the information items "return rate" and "correction comment" to be specified in a point update instruction, and a "return points of selected job at specified rate" button to be pressed when relevant information is input. Note that in FIG. 12, the user usage history list has a cursor displayed on the left side pointing to (i.e., selecting) the log with the "operation date/time" indicated as "10/30 5:00:00 pm", the "log type" indicated as "copy", the "user name" indicated as "tanaka", the "color/monochrome" indicated as "monochrome", and the "quantity" indicated as "10". Also, "50%" is input as the "return rate", and "user complaint" is input as the "correction comment" in the user usage history edit section.

In step S606, the administrator selects one log from the logs included in the user usage history list of FIG. 12, inputs a reduction rate in the input field for "return rate" and a specific comment in the input field for "correction comment" in the user usage history edit section, and presses the "return points of selected job at specified rate" button (step S607). In turn, a point update instruction including specific information of the log of the selected job, the input reduction rate, and the input correction comment is transmitted to the point update unit 202 (step S608). Then, the point update unit 202 transmits a point update request including the contents of the point update instruction to the point update management unit 603 (step S609). Then, based on the point update request, the point update management unit 603 transmits a point update request including the specific information of the log and the reduction rate to the point management unit 602 (step S610). The point management unit 602 calculates a point value to which the current point value is to be updated based on the specific information of the log, the reduction rate, and the point rule information acquired from the conversion rule storage unit 605 (step S611).

For example, it is assumed below that the administrator has selected from the user usage history list of FIG. 12, the log corresponding to the job with the operation time/date "10/30 5:00:00 pm", the log type "copy", the user name "tanaka", the mode "monochrome", the quantity "10", and has input "50%" as the "return rate" in the user usage history list edit section. In this case, the point management unit 602 can determine that the job described in the log with the "log type" indicated as "copy", the "color/monochrome" indicated as "monochrome", and the "quantity" indicated as "10" is subject to point reduction by "50%"; i.e., that the "quantity" is to be reduced by 5. According to the point rule information of Table 5, 1 point is consumed per 1 quantity of monochrome copying. Thus, the point management unit 602 can calculate a point value by reducing the current point value of the user with the user name "tanaka" by 5 and store the calculated point value in the point information storage unit 606.

In step S612, the point management unit 602 updates the current point value of the user specified by the specific information of the log in the point information storage unit 606 based on the calculated point value.

Note that the processes of steps S613 to S616 of FIG. 11 may be substantially identical to the processes of steps S411 to S414 of FIG. 7. By implementing the above-described process operations, the third example process for enabling the administrator to update points may be completed.

Figure 13:
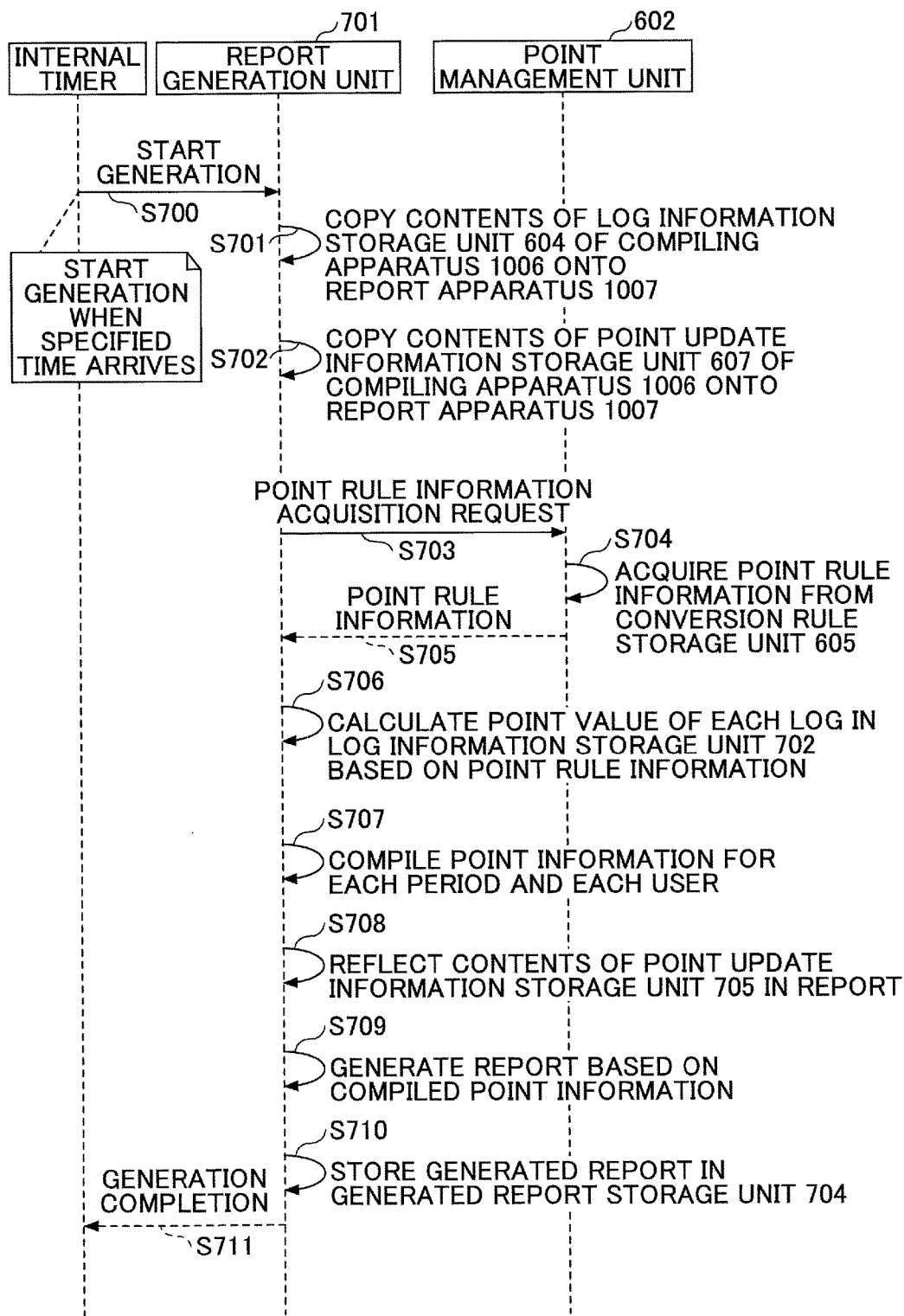
FIG. 13 is a sequence chart illustrating a first example process in which the usage record compiling system generates a report according to an embodiment of the present invention.

FIG. 13 is a sequence chart illustrating a first example process in which the usage history counting system 1000 generates a report according to an embodiment of the present invention.

In step S700, when a specified time arrives, an internal timer of the usage record compiling system 1000 issues a generation start request to the report generation unit 701. In turn, the report generation unit 701 copies the contents of the log information storage unit 604 of the compiling apparatus 1006 onto the log information storage unit 702 of the report apparatus 1007 (step S701). Then, the report generation unit 701 copies the contents of the point update information storage unit 607 of the compiling apparatus 1006 onto the point update information storage unit 705 of the report apparatus 1007 (step S702). Then, the report generation unit 701 transmits a point rule information acquisition request to the point management unit 602 (step S703). Note that the processes of steps S701 to S703 may be performed with respect to a plurality of compiling apparatuses 1006, for example.

In step S704, the point management unit 602 acquires the point rule information from the conversion rule storage unit 605 and transmits the acquired point rule information to the report generation unit 701 (step S705). Then, the report generation unit 701 calculates points for each log in the log information storage unit 702 based on the point rule information (step S706) and compiles point information for each period and for each user (step S707).

In step S708, the report generation unit 701 reflects the contents (point update information) of the point update information storage unit 705 in the report to be generated. In this way, point information can be accurately compiled even when points are corrected by the administrator.

In step S709, the report generation unit 701 generates the report based on point information compiled in steps S707 and S708.

FIG. 14 is a diagram illustrating an example of a report generated by the usage record compiling system 1000 according to an embodiment of the present invention. In FIG. 14, the title of the report is "Usage Record Report", and point information is compiled for each month and for each user. Specifically, information items including "user name", "used point", "correction point", "finalized point", and "remark" are compiled for each month and for each user. The "user name" is information identifying a user. The "used point" is the sum of point values added to the current point value within the period. The "correction point" is the sum of the point values corrected by the administrator within the period. The "finalized point" is a point value obtained by adding up the above "used point" and "correction point". The "remark" is where the correction comment is described in the case where point correction was made by the administrator within the period.

Then, the report generation unit 701 stores the generated report in the generated report storage unit 704 and issues a generation completion notification (step S710). The generation completion notification may be communicated to an apparatus included in the usage record compiling system 1000 that operates the internal timer, for example. Also, the generation completion notification may be communicated to the administrator via a display function of the administrator apparatus 1002, for example. By implementing the above-described process operations, the first example process for enabling the usage record compiling system 1000 to generate a report may be completed.

Figure 15:
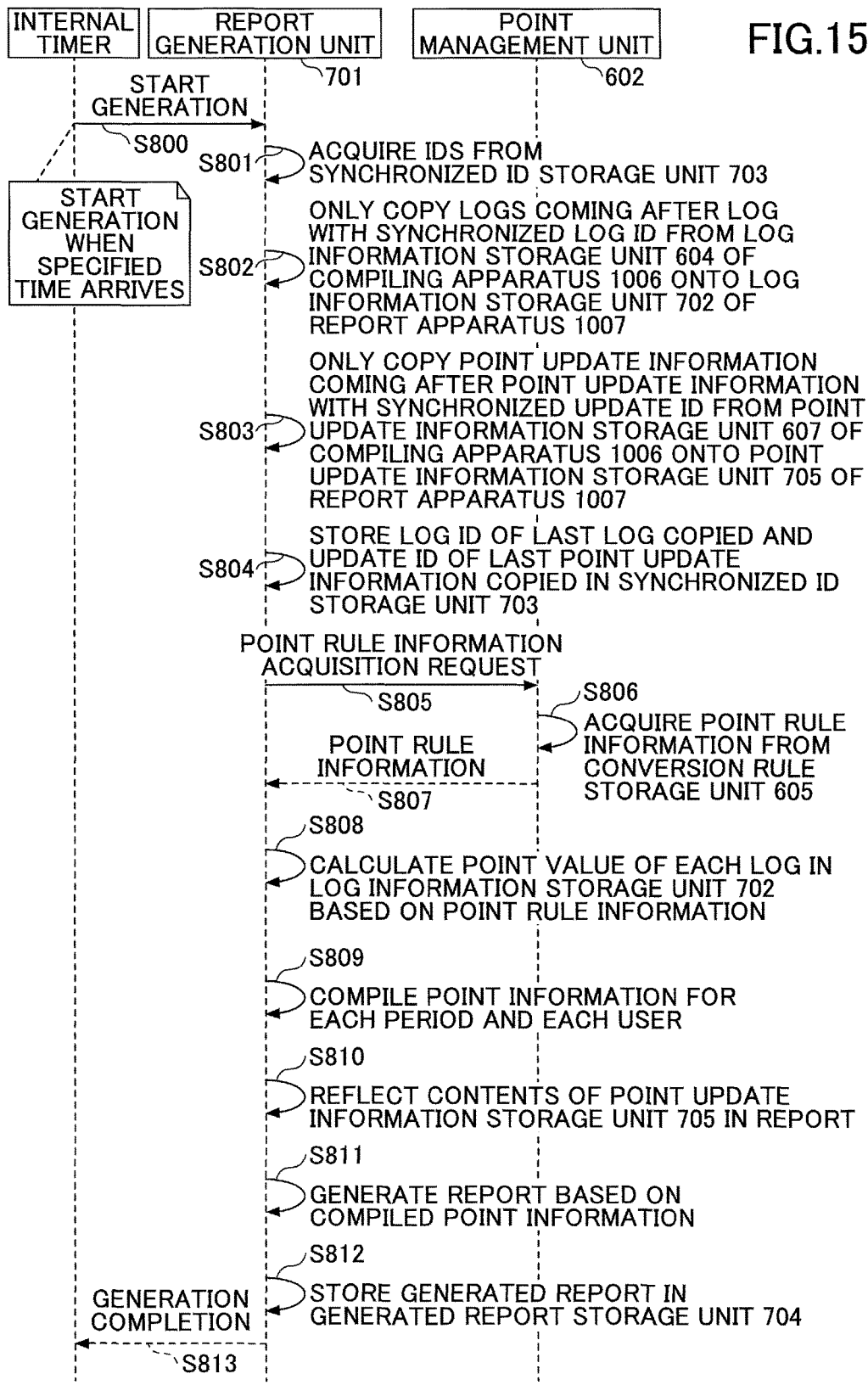
FIG. 15 is a sequence chart illustrating a second example process in which the usage record compiling system generates a report according to an embodiment of the present invention.

FIG. 15 is a sequence chart illustrating a second example process in which the usage record compiling system 1000 generates a report according to an embodiment of the present invention. In the example process of FIG. 15, logs and point update information to be copied may be reduced as compared with the example process illustrated in FIG. 13 so that the processing time for generating a report may be reduced.

Note that the process of step S800 of FIG. 15 is substantially identical to the process of step S700 of FIG. 13.

In step S801, the report generation unit 701 acquires a synchronized log ID and a synchronized update ID from the synchronized ID storage unit 703. Table 7 below represents examples of synchronized IDs stored in the synchronized ID storage unit 703.

TABLE 7

| SYNCHRONIZED LOG ID | SYNCHRONIZED UPDATE ID |
|---|---|
| 6 | 2 |

As illustrated in the above Table 7, the synchronized ID storage unit 703 stores a "synchronized log ID" and a "synchronized update ID". In the log information storage unit 604 or the point update information storage unit 607 of the compiling apparatus 1006, logs or point update information records stored therein are assigned sequential IDs and are arranged in chronological order. The "synchronized log ID" corresponds to the log ID of the newest log among the logs that have already been copied onto the log information storage unit 702. That is, logs with log IDs coming after the "synchronized log ID" correspond to logs (unreported logs) that have not yet been copied onto the log information storage unit 702. Similarly, the "synchronized update ID" corresponds to the update ID of the newest point update information record among the point update information records that have already been copied onto the point update information storage unit 705. That is, point update information records with update IDs coming after the "synchronized update ID" correspond to point update information records (unreported point update information records) that have not yet been copied onto the point update information storage unit 705. Note that when the report generation unit 701 copies logs and point update information records from a plurality of compiling apparatuses 1006, the synchronized ID storage unit 703 may store plural sets of the "synchronized log ID" and the "synchronized update ID", for example.

In step S802, the report generation unit 701 copies only logs with log IDs that come after the synchronized log ID, from among the logs stored in the log information storage unit 604 of the compiling apparatus 1006, onto the log information storage unit 702 in chronological order based on their log IDs.

In step S803, the report generation unit 701 copies point update information records with update IDs that come after the synchronized update ID, from among the point update information records stored in the point update information storage unit 607 of the compiling apparatus 1006, onto the update information storage unit 705 in chronological order based on their update IDs. The copying is completed when the newest log or the newest point update information record stored in the log information storage unit 604 or the point update information storage unit 607 of the compiling apparatus 1006 is copied onto the log information storage unit 702 or the update information storage unit 705.

In step S804, the report generation unit 701 stores the log ID of the last copied log (newest log) and the update ID of the last copied point update information record (newest point update information record) in the synchronized ID storage unit 703.

Note that the processes of steps S805 to S813 may be substantially identical to the processes of steps S703 to S711 of FIG. 13. By implementing the above-described process operations, the second example process for enabling the usage record compiling system 1000 to generate a report may be completed.

As described above, according to an embodiment of the present invention, when points associated with the usage history of a user using the usage record compiling system 1000 need to be corrected, the usage record compiling system 1000 enables an administrator to perform point correction and records the point correction so that the point correction can be accurately reflected in a usage record report relating to a user's usage of the usage record compiling system 1000. That is, the usage record compiling system 1000 according to the present embodiment enables editing and compiling of usage history information that records a usage outcome that was not anticipated by a user, for example.

Note that the above-described authentication application 103 is an example embodiment of a first processor executing an authentication process. The log is an example of history information. The point value is an example of a usage record value. The point update information is an example of update information indicating that a usage record value has been updated. The point management unit 602 is an example embodiment of a second processor or a computer executing a process of calculating a usage record value. The control unit 104 is an example embodiment of the first processor executing a process of transmitting history information. The point information storage unit 606 is an example of a first storage unit. The point update unit 202 and the point update management unit 603 are an example embodiment of the second processor executing a process of updating a usage record value. The point update information storage unit 607 is an example of a second storage unit. The quantity recorded in a log is an example of a processing quantity recorded in history information. The report is an example of a document reporting the usage record value of a user. The report generation unit 701 is an example of the second processor executing a process of generating a document reporting the usage record value of a user.

Note that the above-described first processor and the second processor may be configured by a single processor or a plurality of processors. For example, the first processor may be configured by a processor included in the image forming apparatus 1001 of the above-described embodiment, and the second processor may be configured by a processor included in the compiling apparatus 1006, a processor included in the administrator apparatus 1002, and a processor included in the report apparatus 1007 of the above-described embodiment.

Although the present invention has been described above with reference to certain illustrative embodiments, the present invention is not limited to these embodiments, and numerous variations and modifications may be made without departing from the scope of the present invention.

What is claimed is:

1. A usage record compiling system including an image forming apparatus, the usage record compiling system comprising:
   a first processor;
   a second processor;
   a first memory; and
   a second memory, wherein the first processor and second processor execute program instructions that
      cause the first processor to
         authenticate a user to enable the user to use the image forming apparatus, and
         transmit history information relating to the user's usage of the image forming apparatus during a period in which the authentication is valid; and
      cause the second processor to
         receive the history information from the first processor and calculate a usage record value based on the received history information;

store the calculated usage record value in the first memory;

update the calculated usage record value stored in the first memory; and store update information indicating that the calculated usage record value has been updated in the second memory; and generate a document that reports the usage record value of the user based on one or more calculated usage record values that are stored in the first memory and one or more update information records indicating usage record value updates that are stored in the second memory, wherein the document includes a comment regarding reasons for the updating of the calculated usage value.

2. The usage record compiling system according to claim 1, wherein the execution of the program instructions further causes the second processor to update the calculated usage record value by editing the history information.

3. The usage record compiling system according to claim 1, wherein the execution of the program instructions further causes the second processor to update the calculated usage record value by specifying a reduction rate for reducing a processing quantity recorded in the history information.

4. The usage record compiling system according to claim 1, wherein the execution of the program instructions further causes the second processor to generate a document that reports the usage record value of the user based on one or more calculated usage record values that are stored in the first memory and one or more update information records indicating usage record value updates that are stored in the second memory.

5. The usage record compiling system according to claim 4, wherein the execution of the program instructions further causes the second processor to acquire an unreported usage record value that has not yet been reported from among the one or more usage record values stored in the first memory, acquire an unreported update information record that has not yet been reported from among the one or more update information records stored in the second memory, and generate the document reporting the usage record value of the user based on the acquired unreported usage record value and the acquired unreported update information record.

6. A computer program product comprising a non-transitory computer-readable medium having a program recorded thereon that is executable by a usage record compiling system including an image forming apparatus, the program when executed causing the usage record compiling system to implement processes of:

authenticating a user to enable the user to use the image forming apparatus, based on user authentication information input by user through an operation panel of the image forming apparatus;

transmitting history information, relating to the user's usage of the image forming apparatus during a period in which the authentication is valid, to a computer;

controlling the computer receiving the history information to calculate a usage record value based on the received history information;

storing the calculated usage record value calculated by the computer;

updating the calculated usage record value that has been stored;

storing update information indicating that the calculated usage record value has been updated; and generating a document that reports the usage record value of the user based on one or more calculated usage record values that are stored in the first memory and one or more update information records indicating usage record value updates that are stored in the second memory, wherein the document includes a comment regarding reasons for the updating of the calculated usage value.

7. The computer program product according to claim 6, wherein the calculated usage record value is updated by editing the history information.

8. The computer program product according to claim 6, wherein the calculated usage record value is updated by specifying a reduction rate for reducing a processing quantity recorded in the history information.

9. The computer program product according to claim 6, wherein the execution of the program further causes the usage record compiling system to generate a document reporting the usage record value of the user based on one or more calculated usage record values that have been stored in a first memory and one or more update information records indicating usage record value updates that have been stored in the second memory.

10. The computer program product according to claim 9, wherein the execution of the program further causes the usage record compiling system to acquire an unreported usage record value that has not yet been reported from among the one or more usage record values stored in the first memory, acquire an unreported update information record that has not yet been reported from among the one or more update information records stored in the second memory, and generate the document reporting the usage record value of the user based on the acquired unreported usage record value and the acquired unreported update information record.

11. A usage record compiling method implemented by a usage record compiling system including an image forming apparatus, the usage record compiling method comprising:

authenticating a user to enable the user to use the image forming apparatus, based on user authentication information input by the user through an operation panel of the image forming apparatus;

transmitting history information, relating to the user's usage of the image forming apparatus during a period in which the authentication is valid, to a computer;

controlling the computer receiving the history information to calculate a usage record value based on the received history information;

storing the calculated usage record value calculated by the computer;

updating the calculated usage record value that has been stored;

storing update information indicating that the calculated usage record value has been updated; and generating a document that reports the usage record value of the user based on one or more calculated usage record values that are stored in the first memory and one or more update information records indicating usage record value updates that are stored in the second memory, wherein the document includes a comment regarding reasons for the updating of the calculated usage value.

12. The usage record compiling method according to claim 11, wherein the calculated usage record value is updated by editing the history information.

13. The usage record compiling method according to claim 11, wherein the calculated usage record value is updated by specifying a reduction rate for reducing a processing quantity recorded in the history information.

14. The usage record compiling method according to claim 11, further comprising:
generating a document reporting the usage record value of the user based on one or more calculated usage record values that have been stored in a first memory and one or more update information records indicating usage record value updates that have been stored in a second memory.

15. The usage record compiling method according to claim 14, further comprising:
acquiring an unreported usage record value that has not yet been reported from among the one or more usage record values stored in the first memory;
acquiring an unreported update information record that has not yet been reported from among the one or more update information records stored in the second memory; and
generating the document reporting the usage record value of the user based on the acquired unreported usage record value and the acquired unreported update information record.

* * * * *